United States Patent
Spaulding et al.

(10) Patent No.: US 10,377,353 B2
(45) Date of Patent: Aug. 13, 2019

(54) PARK LOCK SYSTEM FOR A HYBRID ELECTRIC VEHICLE

(71) Applicant: Ford Global Technologies, LLC, Dearborn, MI (US)

(72) Inventors: Todd Curtis Spaulding, Ann Arbor, MI (US); Emad Al-Regib, Westland, MI (US); Salim Sandakli, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 199 days.

(21) Appl. No.: 15/238,190

(22) Filed: Aug. 16, 2016

(65) Prior Publication Data

US 2018/0050668 A1    Feb. 22, 2018

(51) Int. Cl.
| | | |
|---|---|---|
| *B60T 1/00* | (2006.01) | |
| *B60K 6/22* | (2007.10) | |
| *B60T 1/06* | (2006.01) | |
| *F16D 63/00* | (2006.01) | |
| *F16D 127/06* | (2012.01) | |

(52) U.S. Cl.
CPC ............... *B60T 1/005* (2013.01); *B60K 6/22* (2013.01); *B60T 1/062* (2013.01); *F16D 63/006* (2013.01); *B60Y 2200/92* (2013.01); *B60Y 2400/42* (2013.01); *B60Y 2400/81* (2013.01); *F16D 2127/06* (2013.01); *Y10S 903/904* (2013.01)

(58) Field of Classification Search
CPC ........ B60K 2741/283; B60K 2741/265; B60K 2741/205
See application file for complete search history.

(56) References Cited

U.S. PATENT DOCUMENTS

| | | | |
|---|---|---|---|
| 2,974,752 A * | 3/1961 | Howard | B60T 1/005 188/163 |
| 7,490,528 B2 | 2/2009 | Koski et al. | |
| 8,053,691 B2 | 11/2011 | Vernacchia et al. | |
| 8,459,433 B2 * | 6/2013 | Volz | B60T 17/18 192/220.2 |
| 8,636,130 B2 | 1/2014 | Giefer et al. | |
| 8,844,703 B2 * | 9/2014 | Jang | B60T 1/005 192/219.5 |
| 2008/0277237 A1 * | 11/2008 | Ruhringer | F15B 15/261 192/220.2 |
| 2014/0123799 A1 | 5/2014 | Landino et al. | |
| 2014/0216885 A1 * | 8/2014 | Heuver | B60T 1/005 192/219.4 |
| 2015/0027846 A1 * | 1/2015 | Marklen | B60T 1/005 192/219.6 |

FOREIGN PATENT DOCUMENTS

EP          1679456      * 12/2006

* cited by examiner

*Primary Examiner* — Mark A Manley
(74) *Attorney, Agent, or Firm* — David Kelley; McCoy Russell LLP

(57) ABSTRACT

Methods and systems are provided for a park lock system for an automatic transmission. In one example, a park lock system may include a slideable element coupled to a park rod, a lock slot formed by the slideable element, a cam coupled to an end of a shaft, the shaft positioned within a solenoid and moveable by energization of the solenoid, and a pivotable pawl adapted to couple with the lock slot. In one example, the pivotable pawl is coupled to the lock slot by energization of the solenoid, and a position of the slideable element is locked.

14 Claims, 11 Drawing Sheets

PARK LOCK SYSTEM FOR A HYBRID ELECTRIC VEHICLE

FIELD

The present description relates generally to methods and systems for a park lock system of an automatic transmission of a hybrid electric vehicle.

BACKGROUND/SUMMARY

Motorized vehicles may include a shift-by-wire system electrically coupling an automatic transmission of the vehicle to an instrument panel within a cabin of the vehicle. A user may interact with the instrument panel in order to select a gear mode of the transmission. For example, the instrument panel may include a selector dial, and the user may rotate the selector dial to change the gear mode of the transmission to drive, park, neutral, etc. A powertrain control module (PCM) is electrically coupled between the selector dial and the transmission, and the PCM sends a signal to the transmission to change the gear mode in response to a rotation of the selector dial. A servo assembly is often coupled with a park rod and actuated by a hydraulic system of the transmission to engage the park rod with a park pawl when the user changes the gear mode to park. The park pawl engages a park gear of the transmission and locks a rotation of the park gear, thereby preventing the vehicle from moving. The park gear may be unlocked by disengaging the park rod with the park pawl.

One example approach is shown by Landino et al. in U.S. Patent 2014/0123799. Therein, a system for locking a park device of a transmission in an out-of-park mode of operation includes a valve body that defines a bore, a solenoid connected to the valve body, a lock feature disposed in the valve body and interconnected with the solenoid, and a servo piston disposed within the bore of the valve body. The servo piston is coupled with a rod, and hydraulic fluid assists with a movement of the servo piston in order to adjust a mode of the transmission between a park mode and the out-of-park mode. A lock ball is included within the valve body and is used to lock the servo piston into a position corresponding with the out-of-park mode.

However, the inventors herein have recognized potential issues with such systems. As one example, the lock ball may become lodged into its locked position and cause the transmission to be unable to disengage from the out-of-park mode. Additionally, hybrid electric vehicles may not include a hydraulic system capable of generating enough hydraulic pressure to adjust the position of the servo piston and/or the lock ball.

In one example, at least some of the issues described above may be addressed by a park lock system, comprising: a park rod adapted to engage with a park lever of an automatic transmission; a slideable element, including: a first end directly coupled to the park rod; and a slot formed at a second end; a pivotable pawl shaped to couple with the slot; a cam engaged with the pivotable pawl and coupled to a shaft; and a solenoid electromechanically coupled to the shaft. In one example, a motor (e.g., an electric motor) may adjust a position of the slideable element (and therefore, the park rod) so that the transmission is in an out-of-park mode. The shaft may be biased by a biasing member toward the pivotable pawl, and the solenoid may be energized to further urge the cam against the pivotable pawl, thereby pivoting the pivotable pawl to couple with the slot. Coupling the pivotable pawl with the slot locks the transmission into the out-of-park mode. The transmission may be released from the out-of-park mode by de-energizing the solenoid.

In this way, the transmission may return from the out-of-park mode to the park mode when the solenoid is de-energized (e.g., when the vehicle is not in operation). Additionally, due to the biasing of the shaft toward the pivotable pawl by the biasing member, a solenoid with a smaller size may be used to lock transmission into the out-of-park mode. The motor and solenoid may be powered by an electrical system of the vehicle such that the park lock system operates without a hydraulic system, thereby reducing an overall packaging size of the transmission.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-10 are shown approximately to scale, though other relative dimensions may be used.

DETAILED DESCRIPTION

Figure 1:
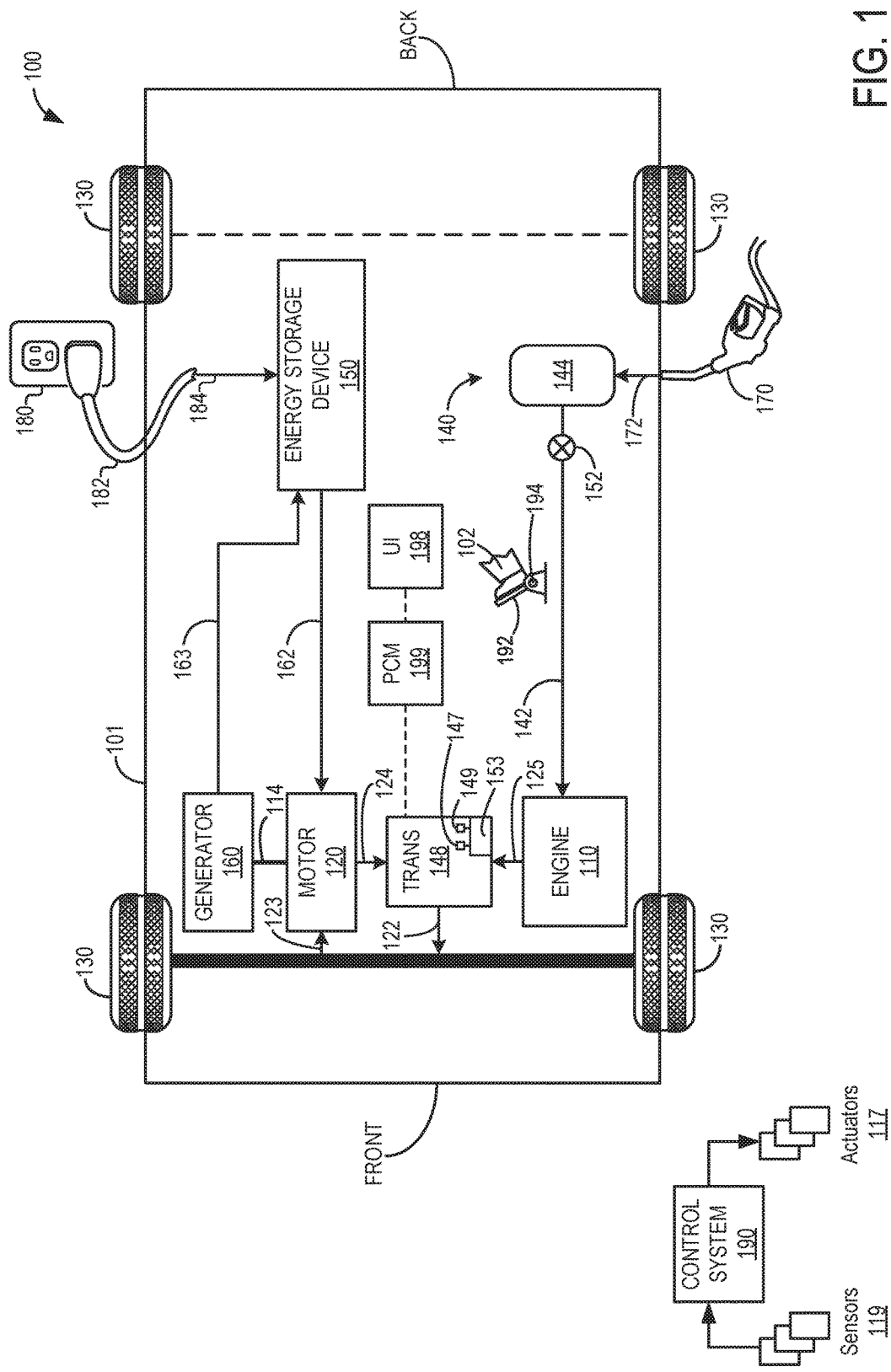
FIG. 1 shows a schematic diagram of a hybrid-electric vehicle system including an automatic transmission and a park lock system.
Figure 2:
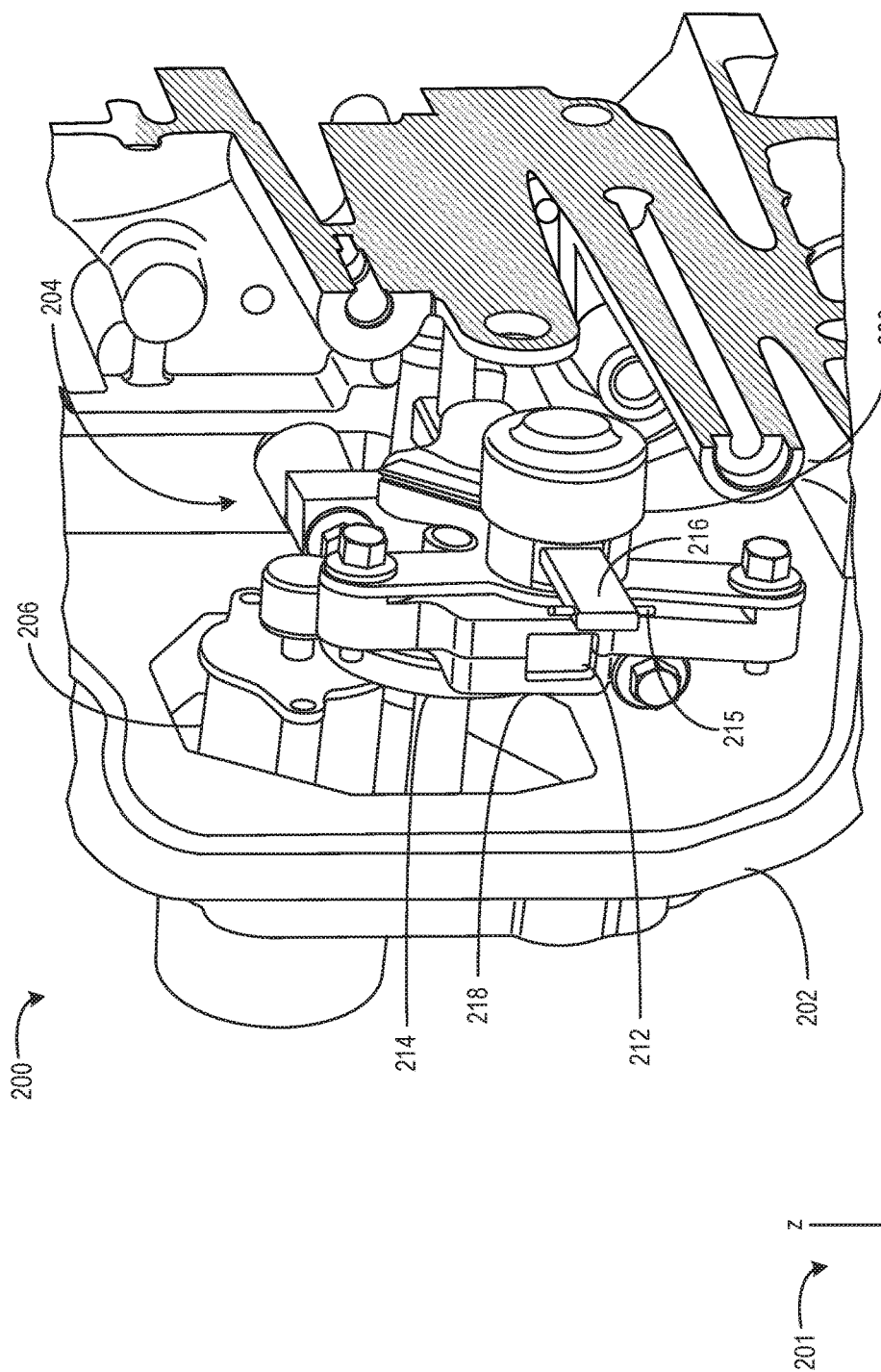
FIG. 2 shows a perspective view of a first embodiment of a park lock system with the park lock system positioned within an interior of an automatic transmission.
Figure 3:
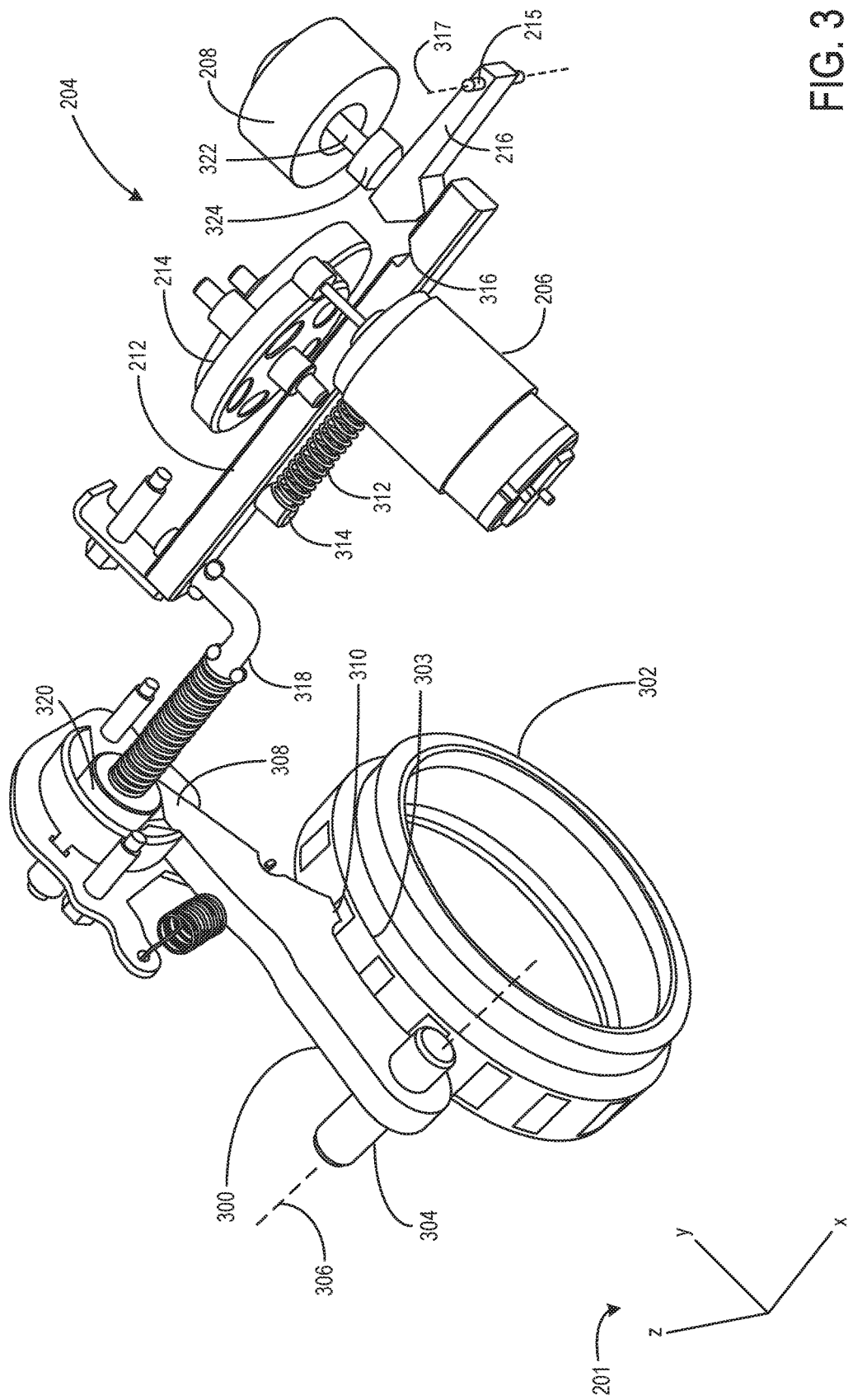
FIG. 3 shows a perspective view of the first embodiment of the park lock system coupled with a park lever of the transmission and with a housing of the transmission removed.
Figure 4:
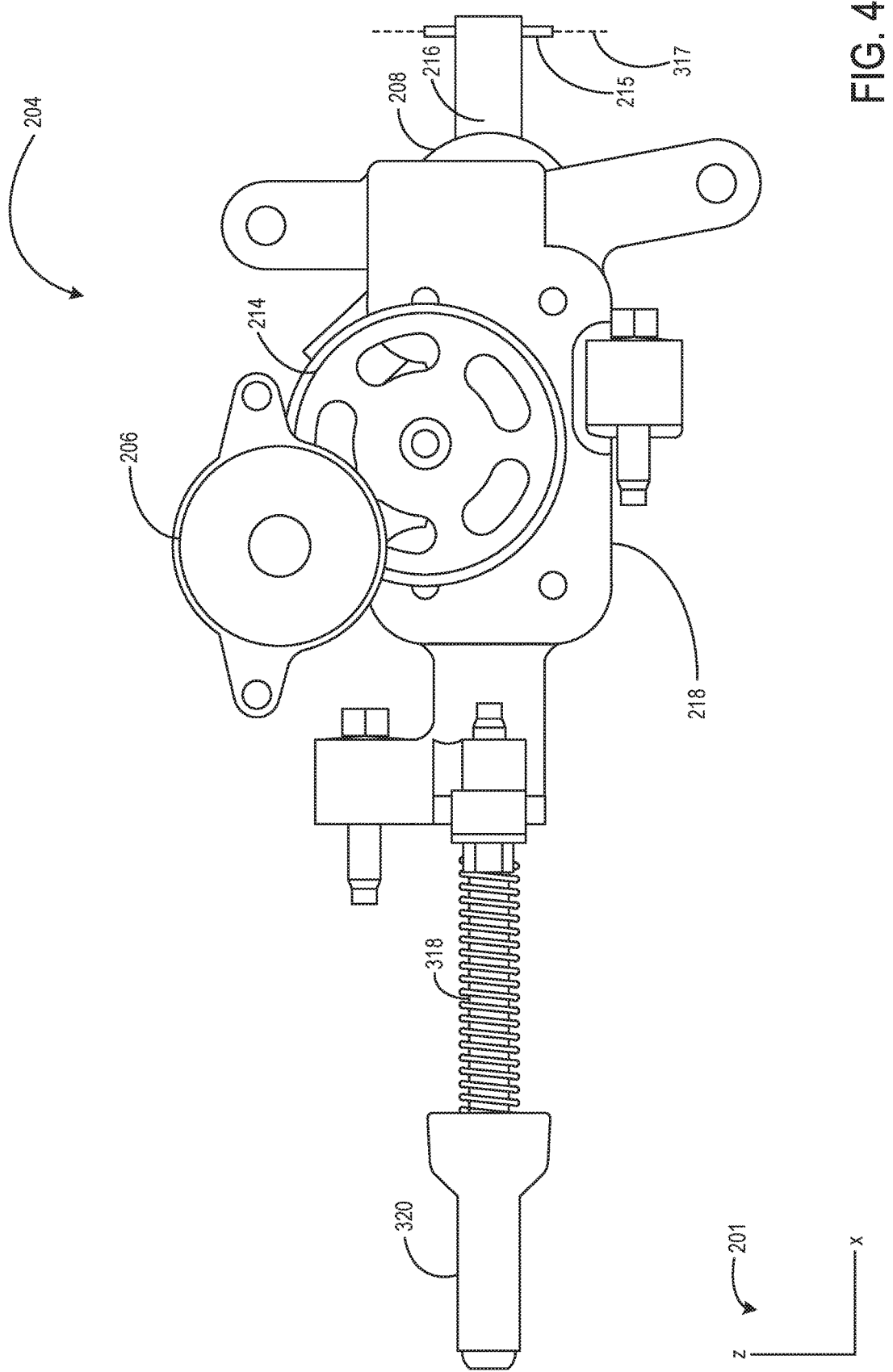
FIG. 4 shows a profile view of the first embodiment of the park lock system with the park lock system removed from the transmission.
Figure 5:
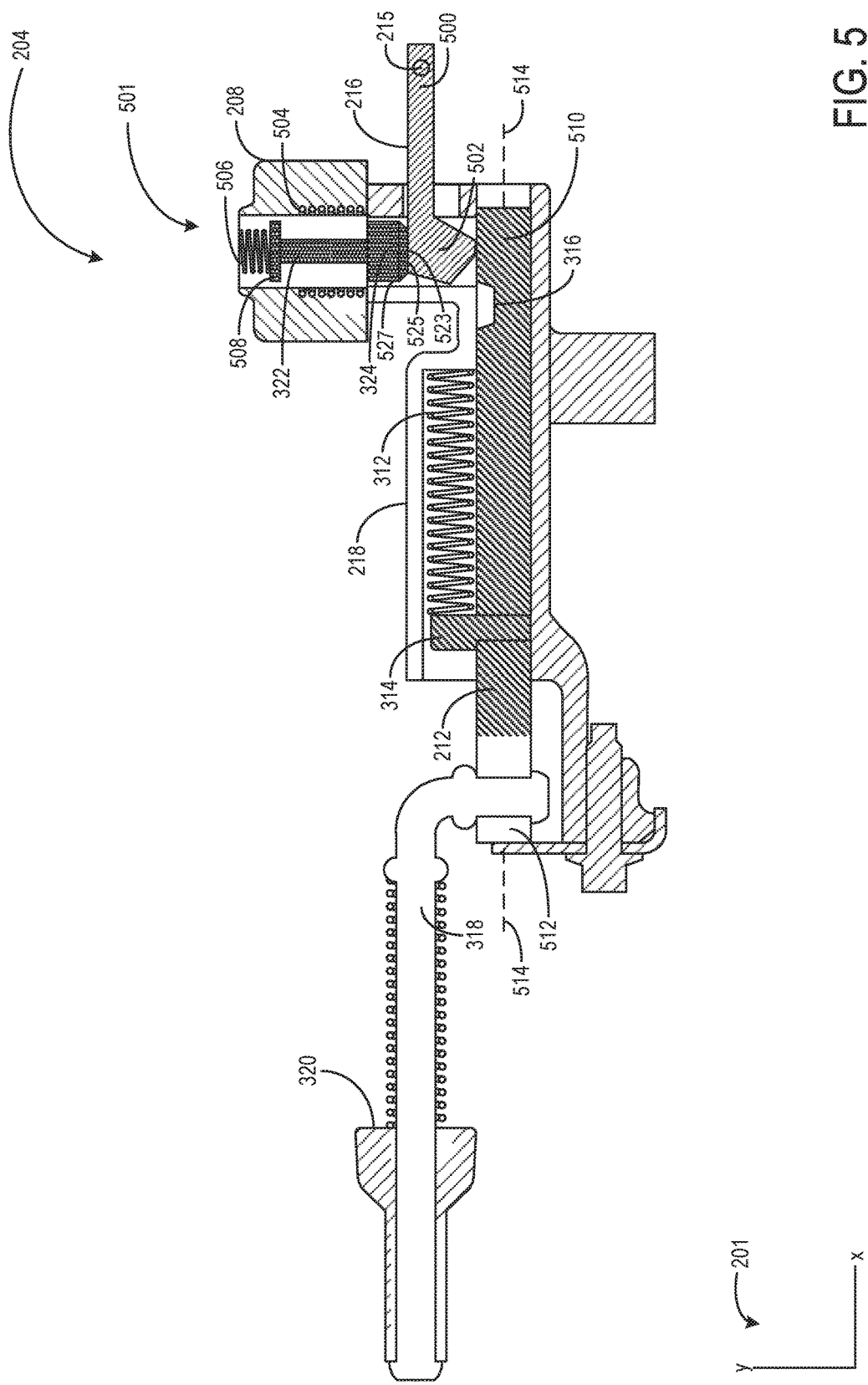
FIG. 5 shows a cross-sectional view of the first embodiment of the park lock system with a park rod of the system in a park position, and a pivotable pawl of the park lock system in an unlocked position.
Figure 6:
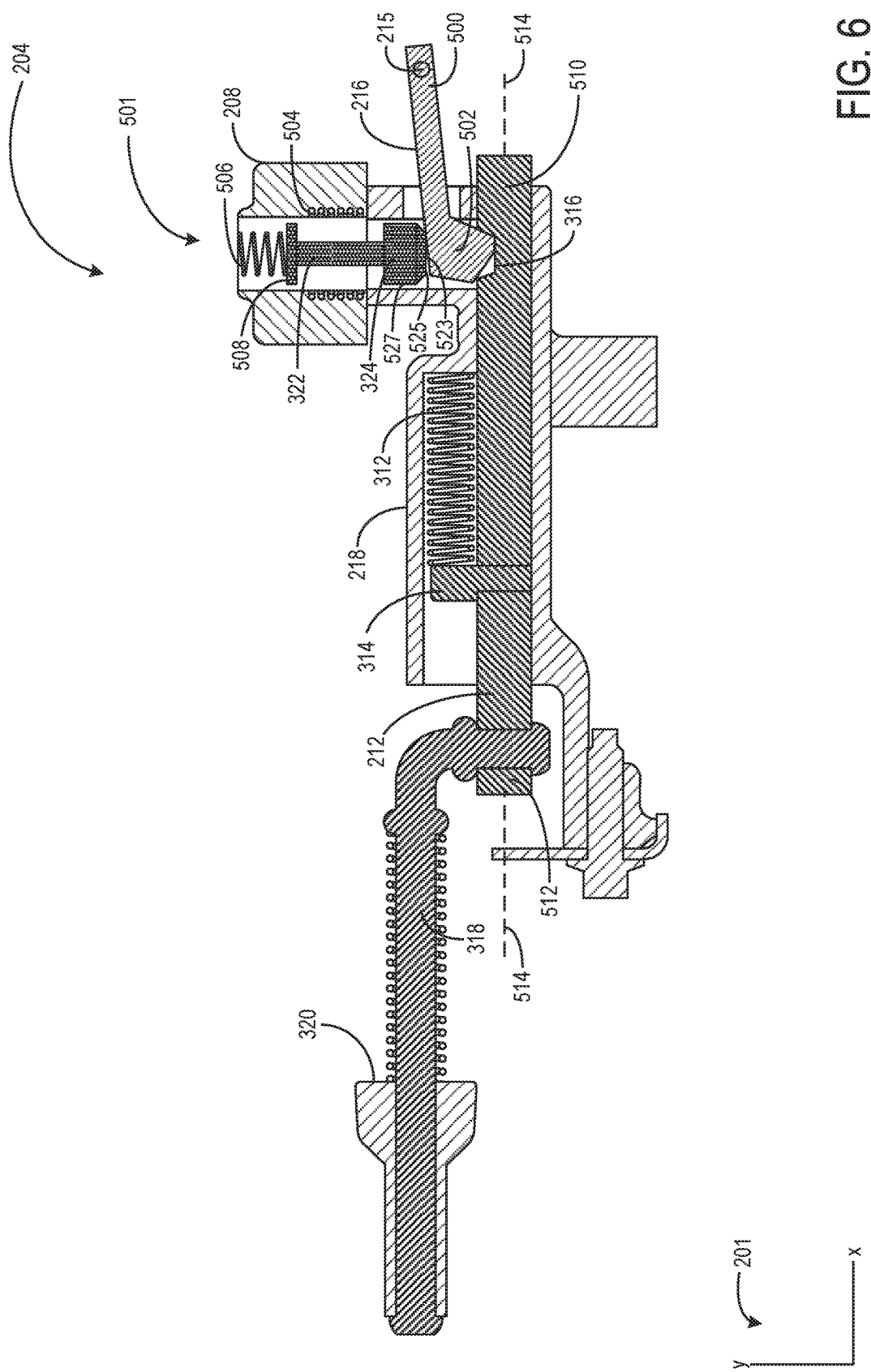
FIG. 6 shows a cross-sectional view of the first embodiment of the park lock system with the park rod of the system in an out-of-park position, and the pivotable pawl in a locked position.
Figure 7:
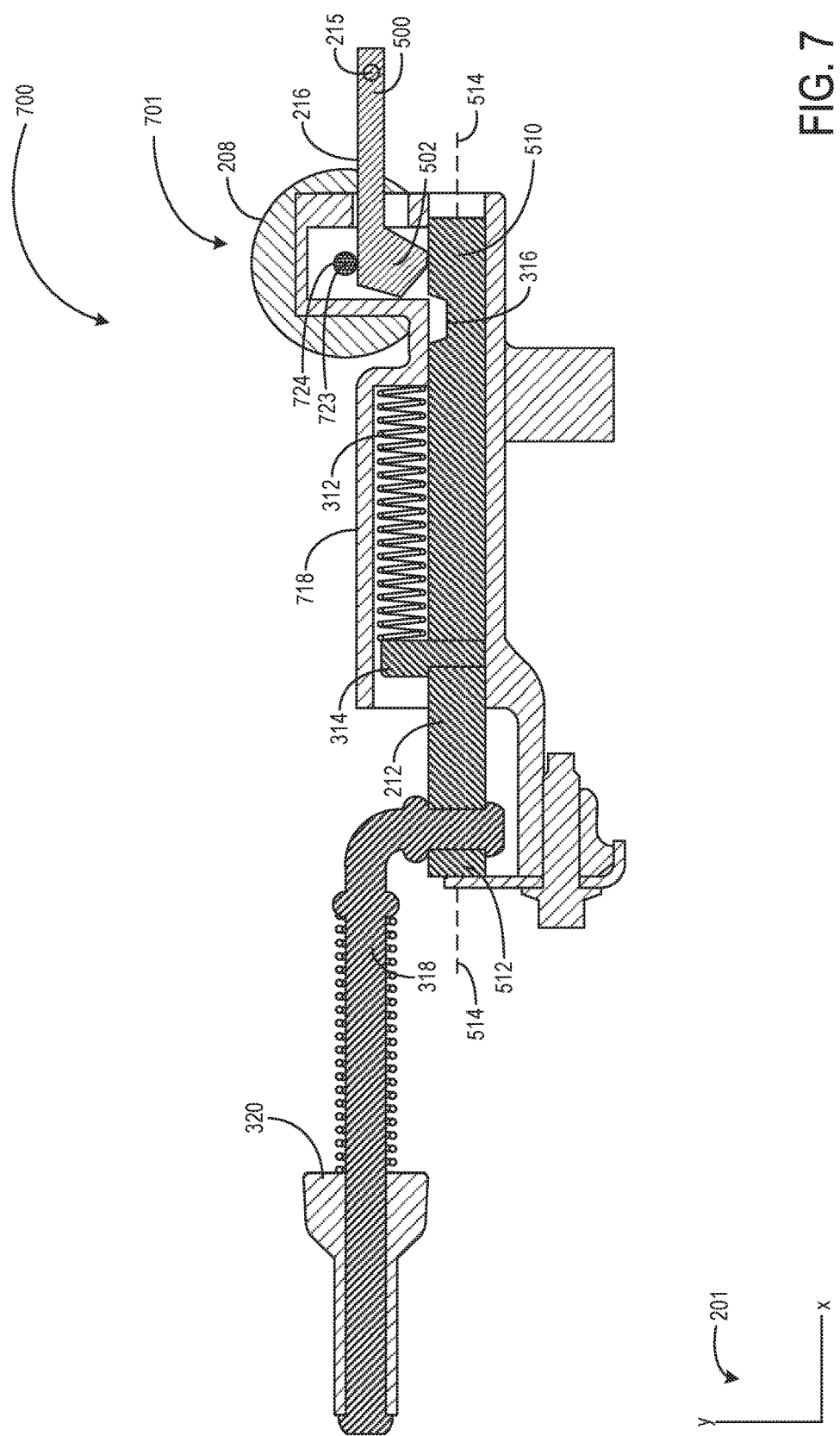
FIG. 7 shows a cross-sectional view of a second embodiment of a park lock system with a park rod of the system in a park position, and a pivotable pawl of the park lock system in an unlocked position.
Figure 8:
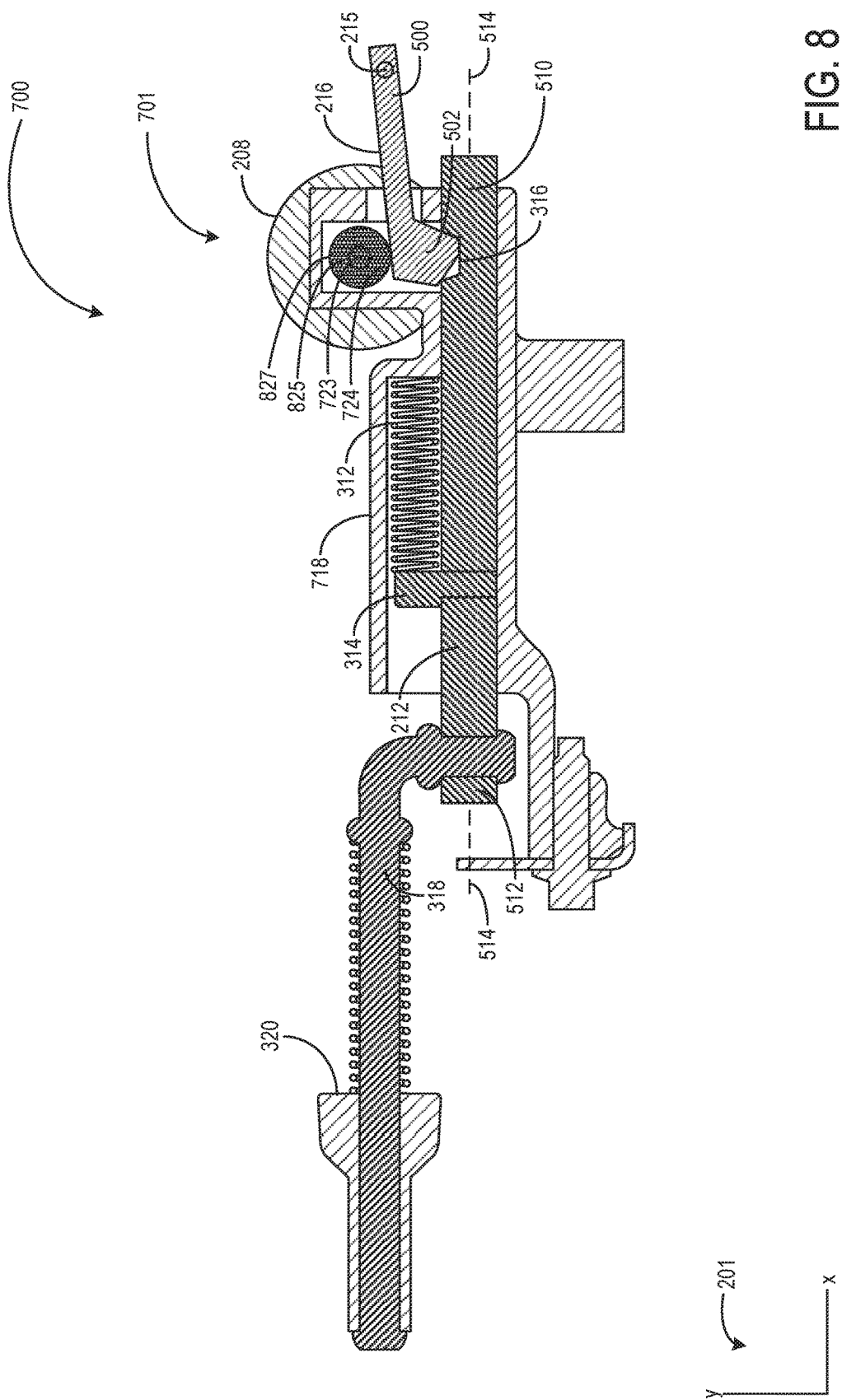
FIG. 8 shows a cross-sectional view of the second embodiment of the park lock system with the park rod of the system in an out-of-park position, and the pivotable pawl in a locked position.
Figure 9:
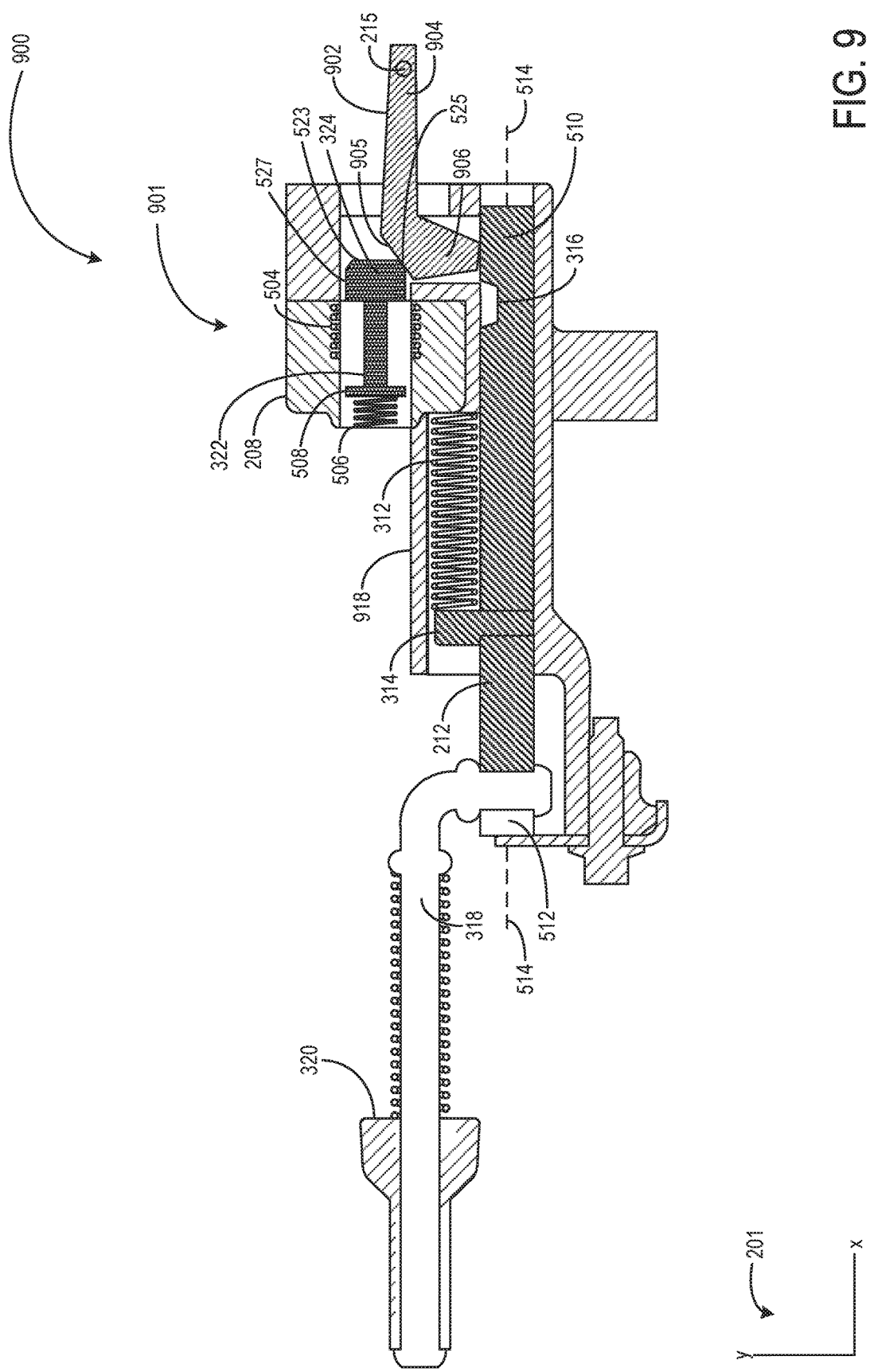
FIG. 9 shows a cross-sectional view of a third embodiment of a park lock system with a park rod of the system in a park position, and a pivotable pawl of the park lock system in an unlocked position.
Figure 10:
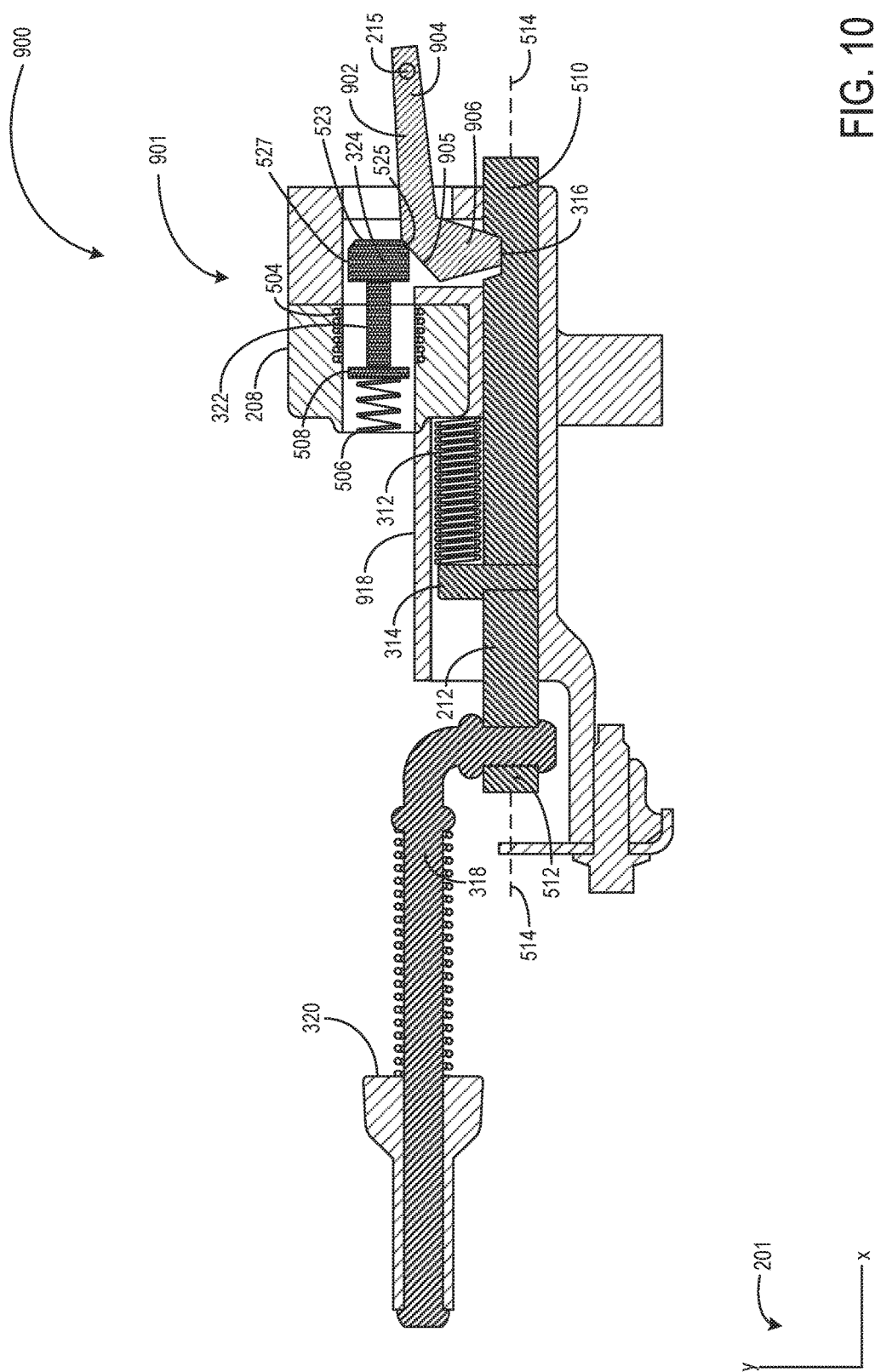
FIG. 10 shows a cross-sectional view of the third embodiment of the park lock system with the park rod of the system in an out-of-park position, and the pivotable pawl in a locked position.
Figure 11:
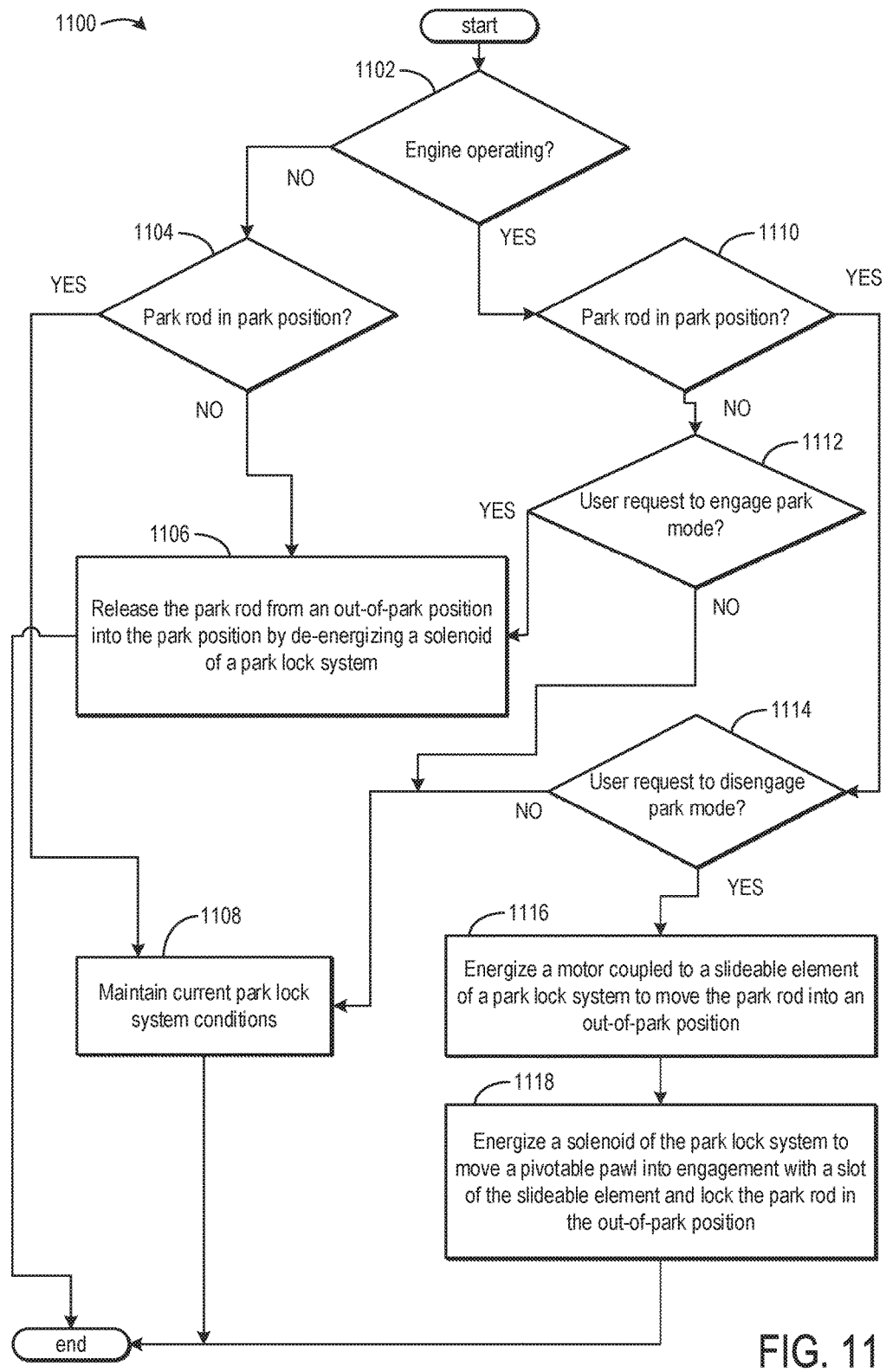
FIG. 11 illustrates an example method for locking a park rod of an automatic transmission into an out-of-park mode by energizing a solenoid of a park lock system, or releasing the park rod into a park mode by de-energizing the solenoid.

The following description relates to systems and methods for a park lock system for an automatic transmission of a hybrid-electric vehicle. A hybrid-electric vehicle may include a powertrain control module electrically coupling an automatic transmission to an instrument panel of the vehicle, as shown by FIG. 1. The automatic transmission may include a park lock system configured to lock the transmission in an out-of-park mode. The park lock system is positioned within an interior of the transmission, as shown by FIG. 2, and is coupled to a park pawl (which may herein be referred to as a park lever) of the transmission, as shown by FIG. 3. The park lock system includes a motor configured to adjust a position of a park rod of the system, as shown by FIG. 4. The park rod is coupled to a slideable element, with the slideable element including a slot adapted to couple with a pivotable pawl, as shown by FIG. 5. The pivotable pawl may lock the park rod into an out-of-park position by energizing a solenoid of the park lock system. The solenoid adjusts a position of a shaft, with a cam coupled to the shaft and engaged with the pivotable pawl, such that energizing the solenoid presses the cam against the pivotable pawl as shown by FIG. 6. In one embodiment, the cam presses against the pivotable pawl in a first direction perpendicular to a central axis of the slideable element and perpendicular to a pivot axis of the pivotable pawl, as shown by FIG. 6. In another embodiment, the cam presses against the pivotable pawl in a direction parallel to the pivot axis of the pivotable pawl and perpendicular to the central axis of the slideable element, as shown by FIGS. 7-8. In yet another embodiment, the cam presses against the pivotable pawl in a direction parallel to the central axis of the slideable element and perpendicular to the pivot axis of the pivotable pawl, as shown by FIGS. 9-10. An example operation of the park lock system is shown by FIG. 11, wherein the pivotable pawl of the park lock system is engaged with the slideable element by energizing the solenoid, or disengaged with the slideable element by de-energizing the solenoid. In this way, the park rod may be locked into an out-of-park mode by pressing the pivotable pawl into the slot of the slideable element with the solenoid, or released (e.g., unlocked) into a park mode by not pressing the pivotable pawl into the slot with the solenoid.

FIG. 1 depicts a schematic representation of an example vehicle system 100 as shown from a top view (e.g., a view vertically above the vehicle, relative to a surface on which the vehicle sits). Vehicle system 100 includes a vehicle body 101 with a front end, labeled "FRONT", and a back end, labeled "BACK." Vehicle system 100 may include a plurality of wheels 130. For example, as shown in FIG. 1, vehicle system 100 may include a first pair of wheels positioned at the front end of the vehicle and a second pair of wheels positioned at the back end of the vehicle.

Vehicle system 100 includes an internal combustion engine 110 and an electric motor 120, each coupled to an automatic transmission 148. Electric motor 120 may be configured to utilize or consume a different energy source than engine 110. For example, engine 110 may consume a liquid fuel (e.g., gasoline) or a gaseous fuel (e.g., natural gas) to produce a first torque output, while electric motor 120 may consume electrical energy to produce a second torque output. The automatic transmission may convert one or each of the first torque output and the second torque output into a rotational motion of the wheels 130 to propel the vehicle system 100. As such, the vehicle system 100 shown by FIG. 1 may be referred to herein as a hybrid-electric vehicle (HEV) system.

HEV system 100 may operate in a variety of different modes in response to operator input and operating conditions. These modes may selectively activate, deactivate, or couple the automatic transmission 148 of the HEV system 100 to the electric motor 120, generator 160, engine 110, or some combination thereof. For example, under select operating conditions, electric motor 120 may supply a torque output to the automatic transmission 148 to propel the HEV system 100 via drive wheel 130 as indicated by line 124 while engine 110 is deactivated. During alternate operating conditions, engine 110 may be set to a deactivated state (as described above) while electric motor 120 may be operated to charge energy storage device 150. In one example, energy storage device 150 may be a rechargeable battery configured to store electrical charge. For example, electric motor 120 may receive wheel torque from drive wheel 130 as indicated by line 123, and the generator may convert the kinetic energy of the HEV system 100 (e.g., energy due to motion of the HEV system 100) into electrical energy for storage at energy storage device 150 as indicated by line 163. This operation may be referred to as regenerative braking of the vehicle. In some embodiments, the electric motor 120 and generator 160 may be a single entity, such as a motor that has electrical energy generation properties. However, in other embodiments, generator 160 may instead receive wheel torque from drive wheel 130, and the generator may convert the kinetic energy of the vehicle to electrical energy for storage at energy storage device 150 as indicated by line 162.

During still further operating conditions, engine 110 may be operated by combusting fuel received from fuel system 140 as indicated by fuel line 142. Fuel line 142 includes fuel valve 152 to control an amount of fuel delivered to engine 110. For example, engine 110 may be operated to propel the vehicle via drive wheel 130 as indicated by line 125 to transmission 148 while electric motor 120 is deactivated. During other operating conditions, both engine 110 and electric motor 120 may each be operated to propel the vehicle via drive wheel 130 as indicated by output 122 from transmission 148. A configuration where both the engine and the motor may selectively propel the vehicle may be referred to as a parallel type vehicle propulsion system. Note that in some embodiments, electric motor 120 may propel the vehicle via a first set of drive wheels and engine 110 may propel the vehicle via a second set of drive wheels. In each configuration (e.g., when the electric motor 120 propels the HEV system 100, when the engine 110 propels the HEV system 100, or when both the electric motor 120 and the engine 110 propel the HEV system 100), the torque output of the engine 110 and/or the electric motor 120 are first transmitted to the automatic transmission 148. The automatic transmission 148 then converts the torque output of the engine 110 and/or the electric motor 120 into a rotation of drive wheels 130 via an output pole (not shown) of the automatic transmission 148, with a rotational speed of the drive wheels 130 and output pole determined by a gear ratio of gears internal to the automatic transmission 148.

The automatic transmission 148 is electrically coupled to a powertrain control module (PCM) 199, and the PCM 199 is electrically coupled to a user interface (UI) 198. For example, the PCM 199 may be configured to receive electrical signals from the UI 198, and transmit electrical signals to the transmission 148. In some embodiments, the PCM 199 may adjust an operating mode of the automatic transmission 148 by adjusting a gear ratio of gears internal to the automatic transmission 148 in response to a signal from the UI 198. For example, the PCM 199 may adjust the automatic transmission 148 to a neutral mode in which the drive wheels 130 are not rotated by the automatic transmission 148 but are able to rotate freely in response to a movement of the HEV system 100, a drive mode in which the drive wheels 130 are rotated in a first direction in response to a torque output of the engine 110 and/or electric motor 120, a reverse mode in which the drive wheels 130 are rotated in a second direction opposite to the first direction, and a park mode in which a torque output of the engine 110 and/or electric motor 120 is not transmitted to the drive wheels 130.

In each of the configurations described above, the PCM 199 may adjust the operating mode of the automatic transmission 148 in response to an input made by a user (e.g., an operator of the HEV system 100) at the UI 198. In one example, an input made by a user at the UI 198 may include a rotation of a dial of the UI 198, with the dial configured to select the mode of the automatic transmission 148. In another example, an input made by the user may include a selection of the mode of the automatic transmission 148 at a touchscreen panel (e.g., a panel responsive to a touch of the user) of the UI 198. Alternate embodiments may include different components of the UI 198 and/or different methods of selecting the mode of the automatic transmission 148 via the UI 198. In each embodiment, however, the adjustment of the mode of the automatic transmission 148 is accomplished electrically (e.g., without a mechanical connection between the UI 198 and the automatic transmission 148) via electrical signals transmitted between the UI 198, PCM 199, and automatic transmission 148.

The automatic transmission 148 includes a park lock system 153, with a first position sensor 147 and a second position sensor 149 coupled to the park lock system 153 within the automatic transmission 148. The first position sensor 147 and second position sensor 149 may measure a position of a park rod (shown by FIGS. 2-10) included within the park lock system 153 and transmit a signal indicating the position of the park rod to the PCM 199. In one example (as described below with reference to FIGS. 2-10), the automatic transmission 148 is adjusted into the park mode when the park rod is in a first position, and is adjusted into an out-of-park mode when the park rod is in a second position. When a user selects an out-of-park mode at UI 198, the UI 198 sends an electrical signal to the PCM 199 indicating the mode selection, and the PCM 199 interprets signals from the first position sensor 147 and second position sensor 149 to determine the position of the park rod. The PCM 199 may then send a signal to an actuator within the park lock system 153 (e.g., a motor, such as the motor shown by FIGS. 2-4 and described below) to adjust the position of the park rod to the second position, thereby adjusting the automatic transmission 148 to an out-of-park mode. The PCM 199 may also send an electrical signal to a solenoid (e.g., the solenoid shown by FIGS. 2-10 and described below) of the park lock system 153 to lock the position of the park rod in the out-of-park position, thereby locking the automatic transmission 148 in the selected out-of-park mode. Further examples of operation of a park lock system, such as park lock system 153, are described further below with reference to FIGS. 2-11.

The fuel system 140 of the HEV system 100 may include one or more fuel storage tanks 144 for storing fuel on-board the vehicle. For example, fuel tank 144 may store a condensed natural gas (CNG) fuel source, such as methane gas. Other embodiments may have a first gaseous fuel source stored in fuel tank 144 and a second liquid fuel source stored in an additional tank. In some embodiments the gaseous fuel source may be coupled to engine 110 as well as electric motor 120, and the liquid fuel source may be coupled to engine 110. Other embodiments may couple gaseous fuel source to electric motor 120 and not engine 110, while engine 110 may be coupled to the liquid fuel source. In some examples, the fuel may be stored on-board the vehicle as a blend of two or more different fuels. In one example, a liquid fuel source may be configured to store a blend of gasoline and ethanol (e.g., E10, E85, etc.) or a blend of gasoline and methanol (e.g., M10, M85, etc.). In another example, a gaseous fuel source may be a blend of methane, hydrogen gas, oxygen gas, or carbon monoxide. Fuels or fuel blends may be delivered to engine 110 as indicated by fuel line 142. Still other suitable fuels or fuel blends may be supplied to engine 110, where they may be combusted at the engine to produce an engine output. The engine output may be utilized to propel the vehicle as indicated by line 125 to transmission 148, or to recharge energy storage device 150 via electric motor 120 or generator 160. Note that in some examples the first gaseous fuel source may be coupled to a transmission or generator directly or via electric motor 120.

In other embodiments, the propulsion system of HEV system 100 may be configured as a series type vehicle propulsion system, whereby the engine does not directly propel the drive wheels. Rather, engine 110 may be operated to power electric motor 120, which may in turn propel the vehicle via drive wheel 130 as indicated by output 122 from transmission 148. For example, during select operating conditions, engine 110 may drive generator 160, which may in turn supply electrical energy to one or more of electric motor 120 as indicated by line 114 or energy storage device 150 as indicated by line 162.

As another example, engine 110 may be operated to drive electric motor 120 which may in turn provide a generator function to convert the engine output to electrical energy, where the electrical energy may be stored in energy storage device 150 for later use by the motor. Embodiments of energy storage device 150 may include one or more rechargeable batteries, fuel cells, and/or capacitors for example. In these examples, electrical energy may be temporarily converted to chemical or potential energy for storage. The vehicle propulsion system may be configured to transition between two or more of the operating modes described above in response to operating conditions.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, components of the park lock system 153 (e.g., the solenoid and motor, as described below with reference to FIGS. 2-10), etc.

Energy storage device 150 may periodically receive electrical energy from a power source 180 residing external to the vehicle (e.g. not part of the vehicle) as indicated by line 184. As a non-limiting example, the propulsion system of HEV system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, electric motor 120 may propel the vehicle by utilizing an energy source other than the fuel utilized by engine 110. It should be understood that though FIG. 1 shows a plug-in hybrid electric vehicle, in other examples, HEV system 100 may be a hybrid vehicle system without plug-in components.

Fuel system 140 may periodically receive fuel from a fuel source residing external to the vehicle. As a non-limiting example, the propulsion system of HEV system 100 may be refueled by receiving fuel via a fuel dispensing device 170 as indicated by line 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp within a cabin of the HEV system 100.

Control system 190 may receive sensory feedback information from one or more of engine 110, electric motor 120, fuel system 140, energy storage device 150, automatic transmission 148, and generator 160. Further, control system 190 may send control signals to one or more of engine 110, electric motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Powertrain control module 199 may be included within control system 190 to control the operating mode of the automatic transmission 148, as described above. PCM 199 may be a microcomputer, including a microprocessor unit, input/output ports, an electronic storage medium for executable programs and calibration values (such as a non-transitory read only memory chip for storing executable instructions), random access memory, keep alive memory, and a data bus. In some embodiments, the control system 190 may also include a separate controller (e.g., separate from PCM 199) configured to receive various signals from sensors 119 coupled to the vehicle system 100, in addition to those signals previously discussed, such as measurement of torque output of the electric motor 120 from a motor speed sensor (not shown), engine speed from an engine speed sensor (not shown), etc., and may transmit those signals to the PCM 199. The PCM 199 receives signals from the various sensors 119 of FIG. 1 and employs various actuators 117 (e.g., the motor and solenoid of the park lock system 153, and other components internal to the transmission 148 as described above) to adjust operation of HEV system 100 based on the received signals and instructions stored on a memory of the PCM 199. For example, adjusting an operating mode of the automatic transmission 148 may include adjusting an actuator of the park lock system 153 (e.g., the motor described below with reference to FIGS. 2-4) to adjust a position of the park rod of the park lock system 153.

FIGS. 2-6 each show a first embodiment of a park lock system from different perspectives and cross-sectional views, while FIGS. 7-8 show cross-sectional views of a second embodiment of a park lock system, and FIGS. 9-10 show cross-sectional views of a third embodiment of a park lock system. The second embodiment and third embodiment each include components similar to those shown by the first embodiment and described with reference to FIGS. 2-6. As such, similar components may be labeled similarly and not re-introduced during the descriptions of each embodiment. For example, the second embodiment shown by FIGS. 7-8 and the third embodiment shown by FIGS. 9-10 each show a different arrangement of the components of the first embodiment shown by FIGS. 2-6. Reference axes 201 are included in each of FIGS. 2-10 in order to compare the embodiments described below.

FIG. 2 shows a perspective view of a park lock system 204 (similar to the park lock system 153 shown by FIG. 1) included within an interior of an automatic transmission 200. In other words, the park lock system 204 is included within a housing 202 of the automatic transmission 200. The park lock system 204 includes a motor 206 coupled to a gear 214, with the gear 214 coupled to a slideable element 212 positioned within a casing 218. The motor 206 and gear 214 are configured to adjust a position of the slideable element 212 within the casing 218. In other words, the motor 206 may be energized (e.g., by electrical current from an electrical component of a vehicle, such as the electric motor 120 of vehicle system 100 described above with reference to FIG. 1) to rotate the gear 214. The rotational motion of the gear 214 results in a linear motion of the slideable element 212 due to a coupling (not shown) of the gear 214 with the slideable element 212.

A solenoid 208 is coupled to the casing 218 and is adapted to adjust a position of a pivotable pawl 216. In other words, the solenoid 208 may be energized (e.g., by electrical current from an electrical system, as described above) in order to pivot the pivotable pawl 216. Examples of the solenoid 208 in an energized mode and de-energized mode are shown and described below with reference to FIGS. 5-10. In the examples shown, the pivotable pawl 216 is coupled to the housing 202 of the automatic transmission 200 by a pivot pin 215 and pivots relative to the housing 202. In alternate embodiments, the pivotable pawl 216 may be coupled to an alternate component of the automatic transmission 200, such as a bracket (not shown) extending from the casing 218.

FIG. 3 shows a perspective view of the park lock system 204 coupled to a park pawl 300 (which may herein be referred to as park lever 300) of the automatic transmission 200 (shown by FIG. 2). In order to illustrate a positioning of the components of the park lock system 204 relative to a position of the park lever 300, the casing 218 (shown by FIG. 2) and other components of the automatic transmission 200 are not shown by FIG. 3.

The park lever 300 is coupled to a park gear 302 of the automatic transmission 200, and is pivotable around a central rod axis 306 of a rod 304. The rod 304 may be coupled to the casing 218 of the automatic transmission 200 in order to retain a position of the park lever 300. The park lever 300 includes a first extension 310 and a second extension 308, with the first extension 310 adapted to couple between a plurality of teeth 303 of the park gear 302. The second extension 308 is adapted to couple with a cam surface 320 of a park rod 318, such that adjusting a position of the park rod 318 adjusts a pivot of the park lever 300. In other words, when the position of the park rod 318 is adjusted, the cam surface 320 presses against the park lever 300 in order to adjust the pivot of the park lever 300 around the central rod axis 306.

The park rod 318 is coupled to the slideable element 212, and a linear motion of the slideable element 212 adjusts a position of the park rod 318. As described above, the position of the slideable element 212 is adjustable by actuation of the motor 206 coupled to gear 214. The slideable element 212 additionally includes an extension 314 coupled to a first biasing member 312. The first biasing member 312 urges the slideable element 212 in a direction of the park rod 318 and park lever 300. By configuring the slideable element 212 in this way, the motor 206 and gear 214 may move the slideable element 212 in a direction away from the park rod 318 and park lever 300, while the first biasing member 312 may move the slideable element 212 in a direction toward the park rod 318 and park lever 300. In this way, the slideable element 212 may be moved from a first position to a second position when the motor 206 is energized, and may return to the first position when the motor 206 is not energized due to the urging of the first biasing member 312 against the slideable element 212. Examples of the slideable element 212 in the first position and the second position are shown by FIGS. 5-10 and described below with reference to FIGS. 5-10.

The first position corresponds to a park position of the automatic transmission 200, while the second position corresponds to an out-of-park position of the automatic transmission 200. For example, when the slideable element 212 is in the first position, the slideable element 212 is urged against the park rod 318 by the first biasing member 312 and presses the cam surface 320 of the park rod 318 against the second extension 308 of the park lever 300. The pressing of the cam surface 320 against the second extension 308 pivots the park lever 300 around the central rod axis 306 such that the first extension 310 moves toward the park gear 302. The first extension 310 may then engage with the park gear 302 between two adjacent teeth 303 of the park gear 302 in order to lock a rotation of the park gear 302.

The slideable element 212 includes a slot 316 adapted to couple with the pivotable pawl 216. For example, when the slideable element 212 is in the second position (e.g., the out-of-park position), the solenoid 208 may be energized (e.g., by a component such as energy storage device 150 shown by FIG. 1) in order to apply a force to a shaft 322, with the shaft 322 electromechanically coupled to the solenoid 208. In other words, energizing the solenoid 208 generates a magnetic field within the solenoid 208, and the shaft 322 is urged by the magnetic field in a direction toward the pivotable pawl 216 positioned between the solenoid 208 and the slideable element 212. A cam 324 coupled to the shaft 322 is positioned to be in face-sharing contact with the pivotable pawl 216, such that when the magnetic field of the solenoid 208 urges the shaft 322 toward the pivotable pawl 216, the cam 324 is pressed against the pivotable pawl 216 by the shaft 322. The pivotable pawl 216 then pivots in a direction of the slot 316 of the slideable element 212 and is pressed into the slot 316.

In an example operation of the park lock system 204, the slideable element 212 is in the first position (e.g., the park position). The first biasing member 312 presses the slideable element 212 against the park rod 318. As a result, the cam surface 320 of the park rod 318 is pressed against the second extension 308 of the park lever 300. The park lever 300 is pivoted around the central rod axis 306 such that the first extension 310 of the park lever 300 is pressed between a pair of adjacent teeth 303 of the park gear 302. In this configuration, the rotation of the park gear 302 is locked.

In order to unlock the rotation of the park gear 302, the motor 206 is energized to rotate the gear 214. The gear 214 moves the slideable element 212 from the first position to the second position, in a direction away from the park lever 300. As a result, a pressing force of the cam surface 320 against the second extension 308 of the park lever 300 is reduced, and the park lever 300 is pivoted around the central rod axis 306 in a direction away from the park gear 302. The first extension 310 is moved into a position away from the teeth 303 of the park gear 302, and the rotation of the park gear 302 is unlocked. The slideable element 212 may then remain in the second position (e.g., the out-of-park position) by energizing the solenoid 208 to press the cam 324 of the shaft 322 against the pivotable pawl 216. The pivotable pawl 216 is pressed into the slot 316, thereby locking the slideable element 212 into the second position. In this way, the park lever 300 is disengaged with the park gear 302, and may remain in disengagement while the solenoid 208 is energized. If the solenoid 208 is de-energized, the slideable element 212 may return to the first position (e.g., the park position), and the park lever 300 may again lock the rotation of the park gear 302. Operation of the park lock system 204 is described in further detail below with reference to FIGS. 4-11.

FIG. 4 shows a side view of the park lock system 204, including the cam surface 320 of the park rod 318, the motor 206, the gear 214, and the casing 218. As described above, energization of the motor 206 rotates the gear 214, and the rotation of the gear 214 adjusts a position of the park rod 318 due to the coupling of the park rod 318 with the slideable element 212 (shown by FIGS. 2-3 and FIGS. 5-10, and described above). When the park rod 318 is moved into the out-of-park position by the motor 206, the park rod 318 may be locked into the out-of-park position by energization of the solenoid 208. Energization of the solenoid 208 results in a pivoting of the pivotable pawl 216 around the pivot axis 317 and presses the pivotable pawl into engagement with the slideable element 212, as described below with reference to FIGS. 5-10.

In some embodiments, the park lock system may include an override tool (not shown) configured to couple with the motor (e.g., motor 206 shown by FIGS. 2-4). The override tool, when coupled with the motor, moves the park rod and slideable element into the out-of-park position and retains the park rod and slideable element in the out-of-park position. For example, during a servicing (e.g., maintenance) of the vehicle system (e.g., vehicle system 100 shown by FIG. 1) and its components, the transmission may be locked into the out-of-park mode by inserting the override tool into the motor of the park lock system. In this way, the transmission may be locked into the out-of-park mode so that the vehicle system may be serviced while the engine and electric motor (e.g., engine 110 and electric motor 120 shown by FIG. 1) are not powered (e.g., when the engine is not running and not in operation, and when the electric motor is not energized).

FIG. 5 shows a cross-sectional view of the park lock system 204, with the slideable element 212 in a park position (e.g., the first position, as described above with reference to FIG. 3). The slideable element 212 is slideable along a central axis 514 (e.g., an axis along a longest length of the slideable element 212). The slideable element 212 includes a first end 512 and a second end 510 arranged opposite to each other along the central axis 514. The first end 512 is coupled to the park rod 318, while the second end 510 includes the slot 316.

The slot 316 is adapted to couple with the pivotable pawl 216, as described above with reference to FIG. 3. The pivotable pawl 216 is pivotable around the pivot pin 215 arranged at a first end 500 of the pivotable pawl 216. A second end 502 of the pivotable pawl 216 includes a plurality of surfaces adapted to match a shape of the slot 316 when the second end 502 of the pivotable pawl 216 is pressed into the slot 316.

In the embodiment of the park lock system 204 shown by FIGS. 2-6, the solenoid 208 is coupled to the casing 218 of the park lock system 204 in a position 501. In this position, the shaft 322 of the solenoid 208 is moveable (e.g., by energizing the solenoid 208) in a direction parallel to the y-axis as indicated by reference axes 201. In other words, the shaft 322 is able to move toward or away from the slideable element 212 in a direction perpendicular to both of the central axis 514 and a pivot axis of the pivotable pawl 216. The cam 324 includes an end surface 523, a cylindrical surface 527, and an angled surface 525 coupling the end surface 523 to the cylindrical surface 527. The angled surface 525 is angled relative to the end surface 523 and extends between the end surface 523 and the cylindrical surface 527. The cam 324 is coupled to a first end of the shaft 322 positioned toward the pivotable pawl 216 such that the cam 324 is in face-sharing contact with the pivotable pawl 216. In other words, the end surface 523 of the cam 324 is in direct contact with the pivotable pawl 216. A base 508 of the shaft 322 is positioned at a second end of the shaft 322 (opposite to the first end) and is coupled to a second biasing member 506 of the solenoid 208. The second biasing member 506 applies a pressing force to the base 508 of the shaft 322 in the direction of the pivotable pawl 216. By configuring the second biasing member 506 to press the shaft 322 toward the pivotable pawl 216, the cam 324 of the shaft 322 is urged against the pivotable pawl 216.

Although the second biasing member 506 presses the cam 324 against the pivotable pawl 216, thereby pressing the pivotable pawl 216 against the slideable element 212, an amount of force exerted against the cam by the second biasing member 506 may be a smaller amount of force (e.g., of a reduced magnitude) than a force against the cam 324 by a magnetic field of the solenoid 208 when the solenoid 208 is energized. For example, the solenoid 208 includes coils 504 which may be energized to produce a magnetic field between the coils 504 in a direction toward the pivotable pawl 216 (e.g., parallel to the y-axis as indicated by reference axes 201). The shaft 322, positioned between the coils 504, may be urged by the magnetic field to press the cam 324 against the pivotable pawl 216, thereby pressing the pivotable pawl 216 against the slideable element 212. A resulting force of the pivotable pawl 216 against the slideable element 212 due to the energization of the solenoid 208 may be greater than a force of the pivotable pawl 216 against the slideable element 212 due to the second biasing member 506. The force of the pivotable pawl 216 against the slideable element 212 is described in further detail below with reference to FIG. 6.

FIG. 6 shows a cross-sectional view of the park lock system 204, similar to the cross-sectional view shown by FIG. 5, with the slideable element 212 in an out-of-park position (e.g., the second position, as described above with reference to FIG. 3). The slideable element 212 has been moved from the park position into the out-of-park position (e.g., by a motor, such as motor 206 shown by FIGS. 2-4), and is locked in the out-of-park position by the pivotable pawl 216. In the view shown by FIG. 6, the solenoid 208 is energized, thereby pressing the second end 502 of the pivotable pawl 216 into the slot 316 of the slideable element 212. The slideable element 212 is thereby locked (e.g., retained) in the out-of-park position by energization of the solenoid 208, as described in further detail below.

When the slideable element 212 is in the out-of-park position, the first biasing member 312 is compressed between the casing 218 and the extension 314 of the slideable element 212. As a result, the first biasing member 312 exerts a restoring force against the slideable element 212 in a direction parallel to the central axis 514 and toward the park lever 300 (shown by FIG. 3). In other words, while the slideable element 212 moves from the park position (shown by FIG. 5) into the out-of-park position (shown by FIG. 6), the first biasing member 312 is compressed, and the restoring force exerted by the first biasing member 312 against the slideable element 212 opposes a force exerted by the motor 206 against the slideable element 212. However, the restoring force has a smaller magnitude (e.g., a smaller amount of force) relative to the force of the motor 206, so the motor 206 moves the slideable element 212 into the out-of-park position.

Due to the urging of the pivotable pawl 216 toward the slideable element 212 by the second biasing member 506 (e.g., due to the pressing of the cam 324 of the shaft 322 against the pivotable pawl 216 by the second biasing member 506), the second end 502 of the pivotable pawl 216 is pressed into face-sharing contact with the slot 316 of the slideable element 212 as the slideable element 212 is moved into the out-of-park position. However, a force applied by the second biasing member 506 against the shaft 322 (and therefore, against the pivotable pawl 216 by the cam 324 of the shaft 322) is not great enough (e.g., does not have a magnitude large enough) to lock the slideable element 212 into the out-of-park position. Therefore, the solenoid 208 is energized to increase the pressing force of the cam 324 against the pivotable pawl 216 in the direction of the slot 316 to lock the slideable element 212 into the out-of-park position. In other words, the force applied by the second biasing member 506 against the pivotable pawl 216 is combined with the force applied by the energized solenoid 208 against the pivotable pawl 216 to lock the pivotable pawl 216 into the slot 316 (and therefore lock the position of the slideable element 212).

The force applied to the pivotable pawl 216 by the energized solenoid 208 is supplemented (e.g., applied in tandem, and in a same direction) with the force applied to the pivotable pawl 216 by the second biasing member 506. By combining the force from the second biasing member 506 with the force from the solenoid 208, a net force against the pivotable pawl 216 is increased. In this way, a size and/or power of the solenoid 208 may be reduced relative to a system which does not include a second biasing member, thereby decreasing a packaging size and/or cost of the park lock system 204.

FIGS. 7-8 each show a second embodiment of a park lock system 700, with the solenoid 208 of the park lock system 700 positioned in a position 701 perpendicular to the position 501 shown by FIGS. 5-6. In other words, the solenoid 208 is coupled to a casing 718 of the park lock system 700 such that a longest length of the shaft (e.g., similar to the shaft 322 shown by FIGS. 3-6) of the solenoid 208 is positioned perpendicular to both of the x-axis and the y-axis as shown by reference axes 201. FIG. 7 shows the slideable element 212 positioned in the park position (e.g., the first position, as described above with reference to FIG. 3), with the solenoid 208 de-energized.

The solenoid 208 includes the shaft (as described above), with a cam 724 coupled to an end of the shaft. The cam 724 may have a different size and/or shape relative to the cam 324 shown by FIG. 3 and FIGS. 5-6. For example, FIG. 8 shows the slideable element 212 in the out-of-park position, with the solenoid 208 energized and the cam 724 in face-sharing contact with the pivotable pawl 216. In this configuration, an angled surface (e.g., angled surface 825 shown by FIG. 8) of the cam 724 presses against the pivotable pawl 216 to press the pivotable pawl 216 into contact with the slot 316. The angled surface 825 is similar to the angled surface 525 shown by FIGS. 5-6 and described above. In other words, the angled surface 825 couples an end surface 723 of the cam 724 to a cylindrical surface (e.g., cylindrical surface 827 shown by FIG. 8) of the cam 724, and is angled relative to the end surface 723. However, in the embodiment shown by FIGS. 7-8, the end surface 723 of the cam 724 may have a different size (e.g., diameter or surface area) than the end surface 523 shown by FIGS. 5-6. Accordingly, an angle between the angled surface 825 and the end surface 723 may be different than an angle between the angled surface 525 and the end surface 523.

By positioning the solenoid 208 in the position 701 and coupling the cam 724 to the shaft, the shaft may move in a direction perpendicular to the x-axis and y-axis as shown by reference axes 201 in order to press the cam 724 against the pivotable pawl 216, thereby pressing the pivotable pawl 216 into the slot 316 and locking the slideable element 212 in the out-of-park position. In some embodiments, positioning the solenoid in this way may reduce a packaging space of the park lock system, so that the park lock system may more easily fit within a housing of an automatic transmission (such as the housing 202 shown by FIG. 2).

FIGS. 9-10 each show a third embodiment of a park lock system 900, with the solenoid 208 of the park lock system 900 positioned in a position 901 perpendicular to both of the position 501 shown by FIGS. 5-6 and the position 701 shown by FIGS. 7-8. In other words, the solenoid 208 is coupled to a casing 918 of the park lock system 900 such that a longest length of the shaft 322 of the solenoid 208 is positioned parallel to the central axis 514 of the slideable element 212. FIG. 9 shows the slideable element 212 positioned in the park position (e.g., the first position, as described above with reference to FIG. 3), with the solenoid 208 de-energized.

The park lock system 900 shown by FIG. 9 includes a pivotable pawl 902 similar to the pivotable pawl 216 shown by FIGS. 3-8. However, due the position 901 of the solenoid 208 shown by FIG. 9, the pivotable pawl 902 has a different shape than the pivotable pawl 216 so that the cam 324 of the shaft 322 may press the pivotable pawl 902 into the slot 316 of the slideable element 212 while the solenoid 208 is in the position 901. For example, the pivotable pawl 902 includes a first end 904 configured to pivot around the pivot pin 215, and a second end 906 configured to couple with the slot 316. The second end 906 includes a first surface 905 positioned in face-sharing contact with the angled surface 525 of the cam 324. As the solenoid is energized (as shown by FIG. 10), the angled surface 525 of the shaft 322 is pressed against the first surface 905 of the pivotable pawl 902. Pressing the cam 324 against the pivotable pawl 902 causes the pivotable pawl 902 to pivot toward the slideable element 212, with the second end 906 of the pivotable pawl 902 pressing into the slot 316 when the slideable element 212 is in the out-of-park position (e.g., when the slideable element 212 is moved into the out-of-park position by the motor 206).

In some embodiments, by configuring the park lock system 900 in this way (e.g., with the solenoid 208 in the position 901), a packaging space of the park lock system may be reduced, so that the park lock system may more easily fit within a housing of an automatic transmission (such as the housing 202 shown by FIG. 2).

FIG. 11 depicts a method 1100 for locking or unlocking a position of a park rod (such as the park rod 318 shown by FIGS. 3-10) within a park lock system (such as the park lock system 204 shown by FIGS. 2-6, park lock system 700 shown by FIG. 7-8, or park lock system 900 shown by FIGS. 9-10) of an automatic transmission coupled to an engine within a vehicle by energizing or de-energizing a solenoid (such as the solenoid 208 shown by FIGS. 2-10). Instructions for carrying out method 1100 and the rest of the methods included herein may be executed by a controller based on instructions stored on a memory of the controller and in conjunction with signals received from sensors of the vehicle system, such as the sensors described above with reference to FIG. 1. The controller may employ engine actuators of the engine system to adjust engine operation, according to the methods described below.

At 1102, the method includes determining whether the engine (such as engine 110 shown by FIG. 1) is operating. Determining whether the engine is operating may be passive and thus is not an action performed by a controller or by the park lock system. Instead, if the engine is in an operating state (e.g., the engine is on, which may include combusting intake air and fuel via engine cylinders, and/or energizing the motor, such as electric motor 120 shown by FIG. 1, to produce a torque output), the method automatically continues from 1102 to 1110, and if the engine is not in an operating state (e.g., the engine is off and is not combusting intake air and fuel, and/or the motor is not energized), the method automatically continues from 1102 to 1104. In both cases (e.g., whether the engine is operating or is not operating), the method continues automatically without assistance or measurement from the controller or any sensors electrically coupled to the controller.

If the engine is not operating at 1102, the method continues to 1104 where the method includes determining whether the park rod is in a park position. The park position may be a position of the park rod in which the park rod locks a rotation of a park gear of the automatic transmission (as described above with reference to FIG. 1). For example, as described above, a cam surface of the park rod may be biased against a park lever by a biasing member, such that the park lever engages with the park gear between a pair of adjacent teeth of the park gear. In one example, the position of the park rod may be determined by one or more position sensors (e.g., first position sensor 147 and second position sensor 149 shown by FIG. 1 and described above) of the park lock system. The position sensors may send a signal to the controller to indicate the position of the park rod.

If the park rod is not in the park position at 1104 (e.g., the park rod is in an out-of-park position), the method continues to 1106 where the method includes releasing the park rod from the out-of-park position into the park position by de-energizing the solenoid of the park lock system. For example, as described above with reference to FIGS. 5-10, the park rod is coupled to a slideable element of the park lock system, and the slideable element includes a slot adapted to couple with a pivotable pawl of the park lock system. When the solenoid is de-energized, a force applied to the pivotable pawl by a cam coupled to a shaft of the solenoid is reduced. The reduced force against the pivotable pawl is not strong enough (e.g., does not have a large enough magnitude) to retain the pivotable pawl in contact with the slot when the solenoid is de-energized. The pivotable pawl may then be ejected from the slot due to a biasing of the slideable element toward the park position by a biasing member (e.g., the first biasing member 312 shown by FIG. 3 and FIGS. 5-10).

In one example, the solenoid may be de-energized as a result of a sudden power loss of the vehicle including the engine, automatic transmission, and park lock system. For example, prior to the sudden power loss, the engine may be operating (e.g., combusting fuel and air, or energizing a motor, such as electric motor 120 shown by FIG. 1) with the park rod in the out-of-park position, and after the sudden power loss, the engine may not be operating (e.g., not combusting fuel and air, and not energizing the motor). Due to the sudden power loss, the solenoid may be de-energized. When the solenoid is de-energized, the park rod automatically (e.g., due to the biasing of the slideable element coupled to the park rod as described above) moves from the out-of-park position to the park position. In this way, the park rod may adjust the automatic transmission from an out-of-park mode to a park mode in the event of sudden vehicle power loss, thereby decreasing a likelihood of vehicle movement when the engine is not operating.

If the park rod is in the park position at 1104, the method instead continues to 1108 where the method includes maintaining current park lock system conditions. For example, maintaining current park lock system conditions may include not adjusting a position of the park rod, not adjusting an energization of the solenoid, etc. In one example, when the engine is not operating and the park rod is in the park position, maintaining current park lock system conditions may reduce a likelihood of vehicle movement.

At 1102, if the engine is operating, the method instead continues to 1110 where the method includes determining whether the park rod is in the park position. As described above with reference to 1104, the position of the park rod may be determined by one or more position sensors (e.g., first position sensor 147 and second position sensor 149 shown by FIG. 1 and described above).

If the park rod is not in the park position at 1110, the method continues to 1112 where the method includes determining whether a user requests to engage the park mode of the automatic transmission. For example, the user (e.g., an operator of the vehicle) may adjust a desired mode of the automatic transmission by selecting the desired mode through a user interface located within a cabin of the vehicle. In one example, the user interface may include a rotatable dial adapted to adjust the mode (e.g., drive, park, neutral, etc.) of the automatic transmission in response to a rotation of the dial by the user. A request to engage the park mode of the automatic transmission may then include rotating the dial until a position indicator of the dial corresponds with the park mode. A powertrain control module (e.g., such as PCM 199 shown by FIG. 1) coupled between the user interface and the automatic transmission may then transmit a signal to actuators (such as the motor 206 shown by FIGS. 2-4, and the solenoid 208 shown by FIGS. 2-10) within the automatic transmission to adjust the mode of the automatic transmission to the park mode.

If the user requests to engage the park mode of the automatic transmission at 1112, the method continues to 1106 where the method includes releasing the park rod from the out-of-park position into the park position by de-energizing the solenoid of the park lock system, as described above.

If the user does not request to engage the park mode of the automatic transmission at 1112, the method continues to 1108 where the method includes maintaining current park lock system conditions, as described above. In one example, when the engine is operating and the park rod is in the out-of-park position, maintaining current park lock system conditions may include maintaining the automatic transmission in a mode other than park mode, such as drive, neutral, etc., by locking the position of the park rod in the out-of-park position.

If instead the park rod is in the park position at 1110, the method continues to 1114 where the method includes determining whether a user requests to disengage the park mode of the automatic transmission. For example, as described above with reference to 1112, the user may adjust a desired mode of the automatic transmission by selecting the desired mode through a user interface located within a cabin of the vehicle. In one example, a request to disengage the park mode of the automatic transmission may include rotating a dial of the user interface (described above) until a position indicator of the dial corresponds with a mode different from the park mode.

If the user requests to disengage the park mode at 1114, the method continues to 1116 where the method includes energizing the motor coupled to the slideable element of the park lock system to move the park rod into the out-of-park position. As an example, the slideable element and a gear of the motor are coupled such that energizing the motor causes the slideable element to move from the park position to the out-of-park position. When the slideable element is moved to the out-of-park position, the park rod is also moved to the out-of-park position, and the automatic transmission is in an out-of-park mode. In this way, energizing the motor adjusts the automatic transmission to the out-of-park mode.

The method then continues to 1118 where the method includes energizing the solenoid of the park lock system to move the pivotable pawl into engagement with the slot of the slideable element and lock the park rod in the out-of-park position. For example, as described above with reference to FIGS. 5-10, energizing the solenoid results in a force against a shaft of the solenoid, and the shaft applies the force to the pivotable pawl in a direction toward the slot of the slideable element. By pressing the pivotable pawl into the slot, the slideable element and park rod are locked into the out-of-park position. In this way, energizing the solenoid retains the automatic transmission in the out-of-park mode (e.g., a mode such as drive, neutral, etc.).

If the user does not request to disengage the park mode at 1114, the method continues to 1108 where the method includes maintaining current park lock system conditions. For example, when the park rod is in the park position and the engine is operating, the user may not request to disengage the automatic transmission from the park position in order to reduce a likelihood of the vehicle moving (e.g., when parked).

The technical effect of energizing the motor of the park lock system is to adjust the automatic transmission of a vehicle system into an out-of-park mode (e.g., with the park rod in the out-of-park position), and energization of the solenoid while the automatic transmission is in the out-of-park mode locks the automatic transmission in the out-of-park mode (e.g., locks the park rod in the out-of-park position by pressing the pivotable pawl into the slot of the slideable element coupled to the park rod). De-energization of the solenoid returns the park rod from the out-of-park position to the park position by releasing the pivotable pawl from the slot of the slideable element. In this way, the operating mode of the automatic transmission may be locked in the out-of-park mode by the park lock device when the vehicle system is in motion (e.g., when engine and/or electric motor of the vehicle system are operating and providing a torque output to the transmission to propel the vehicle). The transmission may then return to the park mode when the vehicle system is not in motion (e.g., by selecting the park mode through the user interface as described above), or may return to the park mode when the vehicle system experiences a sudden power loss (e.g., when the engine and motor are not powering the vehicle system). Configuring the pivotable pawl to press into the slot of the slideable element when the solenoid is energized and to release from the slot when the solenoid is not energized may reduce a likelihood of the automatic transmission becoming stuck in the out-of-park mode, thereby increasing a reliability of the transmission.

FIGS. 2-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a park lock system includes: a park rod adapted to engage with a park lever of an automatic transmission; a slideable element, including: a first end directly coupled to the park rod; and a slot formed at a second end; a pivotable pawl shaped to couple with the slot; a cam engaged with the pivotable pawl and coupled to a shaft; and a solenoid electromechanically coupled to the shaft. In a first example of the park lock system, a first biasing member coupled to the slideable element, with the slideable element biased toward the park rod by the first biasing member. A second example of the park lock system optionally includes the first example, and further includes wherein the slot formed at the second end of the slideable element is the only slot formed at the second end, and wherein the second end is positioned opposite from the first end along a central axis of the slideable element. A third example of the park lock system optionally includes one or both of the first and second examples, and further includes wherein a park position of the slideable element locks a rotation of an output pole of the automatic transmission. A fourth example of the park lock system optionally includes one or more or each of the first through third examples, and further includes a motor adapted to adjust a position of the slideable element. A fifth example of the park lock system optionally includes one or more or each of the first through fourth examples, and further includes an override tool adapted to couple with the motor, and wherein the override tool locks a position of the slideable element in an out-of-park position. A sixth example of the park lock system optionally includes one or more or each of the first through fifth examples, and further includes wherein the pivotable pawl pivots around a first axis perpendicular to the central axis of the slideable element. A seventh example of the park lock system optionally includes one or more or each of the first through sixth examples, and further includes wherein the cam engages with the pivotable pawl in a direction perpendicular to both of the first axis and the central axis. An eighth example of the park lock system optionally includes one or more or each of the first through seventh examples, and further includes wherein the cam engages with the pivotable pawl in a direction parallel to the first axis and perpendicular to the central axis. A ninth example of the park lock system optionally includes one or more or each of the first through eighth examples, and further includes wherein the cam engages with the pivotable pawl in a direction perpendicular to the first axis and parallel to the central axis. A tenth example of the park lock system optionally includes one or more or each of the first through ninth examples, and further includes a second biasing member coupled to the solenoid, and wherein the second biasing member biases the shaft toward the pivotable pawl.

In one embodiment, a method includes: locking a park rod of an automatic transmission of a hybrid-electric vehicle into a first position by energizing a solenoid to urge a cam of a shaft against a pivotable pawl, the pivotable pawl moving into engagement with a single slot of a slideable element of a park lock system coupled to the park rod; and releasing the park rod into a second position by de-energizing the solenoid. In a first example of the method, the method includes moving the park rod into the first position by energizing a motor coupled to the slideable element, the slideable element directly coupled to the park rod. A second example of the method optionally includes the first example, and further includes energizing the motor in response to a signal from a powertrain control module to move the park rod into the first position, or de-energizing the solenoid in response to a signal from the powertrain control module to release the park rod into the second position. A third example of the method optionally includes one or each of the first and second examples, and further includes wherein locking the park rod into the first position and releasing the park rod into the second position each include urging the pivotable pawl toward the slideable element with a first biasing member coupled to the solenoid. A fourth example of the method optionally includes one or more or each of the first through third examples, and further includes wherein the solenoid is de-energized when the engine is not operating to release the park rod from the first position to the second position.

In one embodiment, a vehicle system includes: an engine coupled with a motor and an automatic transmission for driving the vehicle; a powertrain control module electrically coupled between the transmission and a user interface element; and a park lock system positioned within the transmission, including: a park rod; a slideable element coupled to the park rod and including a single locking slot; a pivotable pawl adapted to engage with the locking slot; a cam adapted to engage with the pawl; a shaft coupled to the cam; and an energizable solenoid coupled to the shaft. In a first example of the vehicle system, a first end of the slideable element is coupled to the park rod, and wherein the locking slot is positioned at a second end, opposite to the first end. A second example of the system optionally includes the first example, and further includes wherein a first biasing member is coupled between the solenoid and the shaft, and wherein the slideable element is biased toward the park rod by a second biasing member coupled between an extension of the slideable element and a casing of the park lock system. A third example of the method optionally includes one or both of the first and second examples, and further includes wherein a first force applied to the shaft by the first biasing member is less than a second force applied to the shaft by the solenoid.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A park lock system, comprising: a park rod adapted to engage an automatic transmission park lever; a slideable element, including: a first end of the slideable element directly coupled to the park rod; and only one slot at a second end of the slideable element, the second end positioned opposite from the first end along a central axis of the slideable element; only one pivotable pawl including only one pivot and a first end of the pivotable pawl shaped to couple directly with the slot, wherein the pivotable pawl pivots around a first axis positioned perpendicular to the central axis of the slideable element at an opposing, second end of the pivotable pawl; a cam engaged with the pivotable pawl and coupled to a shaft; and a solenoid electromechanically coupled to the shaft; wherein an angled surface of the cam engages with the pivotable pawl in a direction parallel to the first axis and perpendicular to the central axis.

2. The park lock system of claim 1, further comprising a first biasing member coupled to the slideable element, with the slideable element biased toward the park rod by the first biasing member.

3. The park lock system of claim 2, wherein the park lock system does not include a hydraulic system.

4. The park lock system of claim 3, wherein a park position of the slideable element locks a rotation of an output pole of an automatic transmission.

5. The park lock system of claim 4, further comprising an electric motor adapted to adjust a position of the slideable element.

6. The park lock system of claim 5, further comprising an override tool adapted to couple with the electric motor, and wherein the override tool locks the position of the slideable element in an out-of-park position.

7. The park lock system of claim 2, further comprising a second biasing member coupled to the solenoid, and wherein the second biasing member biases the shaft toward the pivotable pawl.

8. A method, comprising:
  locking a park rod of an automatic transmission of a hybrid-electric vehicle into a first position without a hydraulic system by energizing a solenoid to urge a cam at a first end of a shaft against a first end of a pivotable pawl, the shaft positioned between coils of the solenoid and having a base at an opposing, second end of the shaft coupled to a first biasing member of the solenoid, the first end of the pivotable pawl moving directly into engagement with a single slot of a slideable element of a park lock system coupled to the park rod by pivoting around a first axis positioned perpendicular to a central axis of the slideable element at an opposing, second end of the pivotable pawl; and
  releasing the park rod into a second position without the hydraulic system by de-energizing the solenoid and biasing the slideable element toward the park rod via a second biasing member offset from the central axis of the slideable element and coupled between an extension of the slideable element and a casing of the park lock system.

9. The method of claim 8, further comprising moving the park rod into the first position by energizing an electric motor coupled to the slideable element, the slideable element directly coupled to the park rod.

10. The method of claim 9, further comprising energizing the electric motor in response to a signal from a powertrain control module to move the park rod into the first position, or de-energizing the solenoid in response to a signal from the powertrain control module to release the park rod into the second position.

11. The method of claim 10, wherein locking the park rod into the first position and releasing the park rod into the second position each include urging the first end of the pivotable pawl toward the slideable element by pressing the base of the shaft with the first biasing member of the solenoid, wherein the first end of the pivotable pawl directly contacts the cam.

12. The method of claim 11, wherein the solenoid is de-energized when an engine is not operating to release the park rod from the first position to the second position.

13. A vehicle system, comprising:
an engine coupled with a motor and an automatic transmission for driving a vehicle;
a powertrain control module electrically coupled between the transmission and a user interface element; and
a park lock system positioned within the transmission, including:
a park rod;
a slideable element coupled to the park rod and including a single locking slot;
only one pivotable pawl adapted to engage directly with the locking slot;
a cam adapted to engage with the pivotable pawl;
a shaft coupled to the cam; and
an energizable solenoid coupled to the shaft;
wherein the park lock system does not include a hydraulic system;
wherein a first end of the slideable element is coupled to the park rod, and wherein the locking slot is positioned at a second end of the slideable element, opposite to the first end; and
wherein a first biasing member is coupled between the solenoid and the shaft, and wherein the slideable element is biased toward the park rod by a second biasing member coupled between an extension of the slideable element and a casing of the park lock system, the second biasing member offset from a central axis of the slideable element.

14. The vehicle system of claim 13, wherein a first force applied to the shaft by the first biasing member is less than a second force applied to the shaft by the solenoid.

* * * * *